US010353074B2

(12) United States Patent
Justice et al.

(10) Patent No.: US 10,353,074 B2
(45) Date of Patent: Jul. 16, 2019

(54) AGILE NAVIGATION AND GUIDANCE ENABLED BY LIDAR (ANGEL)

(71) Applicant: Irvine Sensors Corporation, Costa Mesa, CA (US)

(72) Inventors: James Justice, Newport Beach, CA (US); Medhat Azzazy, Laguna Niguel, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 19 days.

(21) Appl. No.: 15/479,802

(22) Filed: Apr. 5, 2017

(65) Prior Publication Data

US 2018/0081063 A1    Mar. 22, 2018

Related U.S. Application Data

(60) Provisional application No. 62/318,909, filed on Apr. 6, 2016.

(51) Int. Cl.
| | |
|---|---|
| *G08G 1/16* | (2006.01) |
| *G08G 5/04* | (2006.01) |
| *G01S 17/10* | (2006.01) |
| *G01S 17/42* | (2006.01) |
| *G01S 17/89* | (2006.01) |
| *G01S 17/93* | (2006.01) |
| *G01S 7/481* | (2006.01) |
| *G01S 7/486* | (2006.01) |

(52) U.S. Cl.
CPC .......... *G01S 17/93* (2013.01); *G01S 7/4813* (2013.01); *G01S 7/4814* (2013.01); *G01S 7/4816* (2013.01); *G01S 7/4817* (2013.01); *G01S 7/4861* (2013.01); *G01S 7/4863* (2013.01); *G01S 17/10* (2013.01); *G01S 17/42* (2013.01); *G01S 17/89* (2013.01); *G08G 1/165* (2013.01); *G08G 1/166* (2013.01); *G08G 5/045* (2013.01)

(58) Field of Classification Search
CPC .... G01S 7/4813; G01S 7/4814; G01S 7/4816; G01S 7/4817; G01S 7/4861; G01S 7/4863; G01S 17/10; G01S 17/42; G01S 17/89
USPC ........................................................ 701/301
See application file for complete search history.

(56) References Cited

U.S. PATENT DOCUMENTS

2012/0044476 A1\* 2/2012 Earhart ................. G01S 3/7867
356/4.01

\* cited by examiner

*Primary Examiner* — Maceeh Anwari
(74) *Attorney, Agent, or Firm* — W. Eric Boyd, Esq.

(57) ABSTRACT

A low Size, Weight, and Power (SWaP) Agile Navigation and Guidance Enabled by LIDAR (ANGEL) sensor system that enables deployment on a wide variety of air and surface vehicle that have need of accurate situation awareness and have need of timely warning of potential objects that may cause collisions. A highly functional LIDAR sensor system provides accurate and timely detection and localization of potential threat objects. The ANGEL LIDAR sensor system operates in a fully eye-safe spectral band which enables it to be deployed and pose no threat to human vision impairment. The spectral band of operation also enables successful operation under day and night conditions and under conditions of degraded visual environment caused by such weather conditions as dust, fog, and rain.

6 Claims, 5 Drawing Sheets

ANGEL Exemplar Design Concept

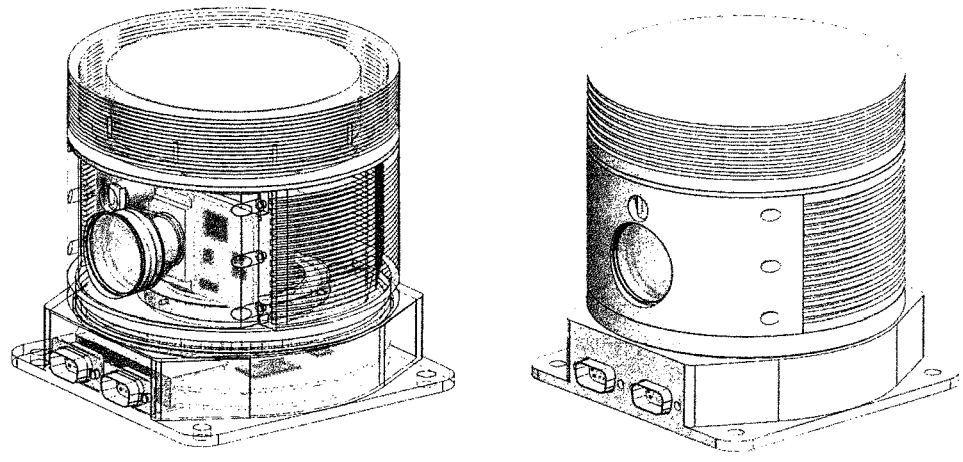
Height = 12 cm
Diameter = 10 cm
Weight = 1.2 Kg
Power = 45 Watts
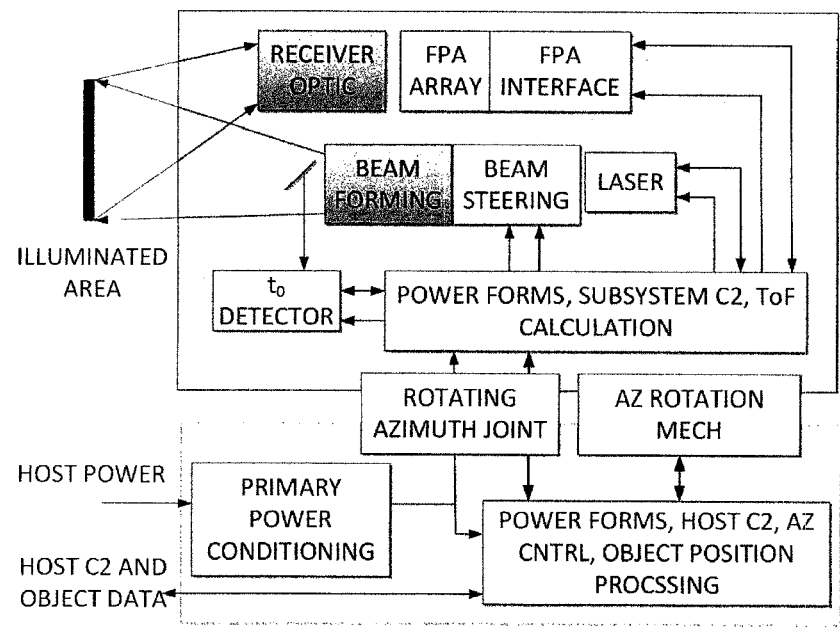
Figure 1. ANGEL Exemplar Design Concept

| Parameter | Value | Units |
|---|---|---|
| Laser | | |
| 1  Laser energy per pulse | 50.00 | uJ pulse |
| 2  Number of required laser pulses per second | 16 | kHz |
| 3  Laser wavelength | 1.536 | um |
| 4  Laser pulse width | 80 | nsec |
| 5  Number of laser diodes | 1 | |
| 6  Laser Size in pixels (x-direc) | 1 | pixels |
| 7  Laser Size in pixels (y-direc) | 256 | pixels |
| 8  Number of scene updates per second | 5 | Hz |
| Optics | | |
| 9  Transmission efficiency | 82.80% | |
| 10 Receiver efficiency | 70.24% | |
| 11 Clear atmosphere extinction coefficient | 5.83E-02 | km^-1 |
| 12 Hazy atmosphere extinction coefficient | 2.82E-01 | km^-1 |
| 13 Aperture diameter | 3 | cm |
| 14 Instantaneous field of view | 2000 | urad |
| 15 Azimuth field of view | 0.11 | degrees |
| 16 Elevation field of view | 29.34 | degrees |
| 17 Azimuth field of regard | 360 | degrees |
| 18 Elevation field of regard | 29.3 | degrees |
| F/# | 0.83 | |

| Parameter | Value | Units |
|---|---|---|
| Target | | |
| 19 Surface reflectance (typ) | 0.5 | |
| 20 Surface reflectance (min) | 0.2 | |
| Receiver | | |
| 21 System bandwidth | 6.25 | Mhz |
| 22 Receiver filter | 30 | nm |
| 23 Detector pixel size (x-direc) | 1 | pixels |
| 24 Detector pixel size (y-direc) | 256 | pixels |
| 25 Detector pixel dimension | 50 | micron |
| 26 Detector quantum efficiency | 0.8 | |
| 27 Excess noise factor | 1.3 | |
| 28 Detector gain | 1.0 | |
| 29 Pixel fill factor | 0.88 | |
| 30 Dark current noise (bulk) | 100 | pAmp |
| 31 Pre-Amplifier/electronic noise | 600 | electrons |

Figure 2. Exemplar ANGEL Specific Design Parameters

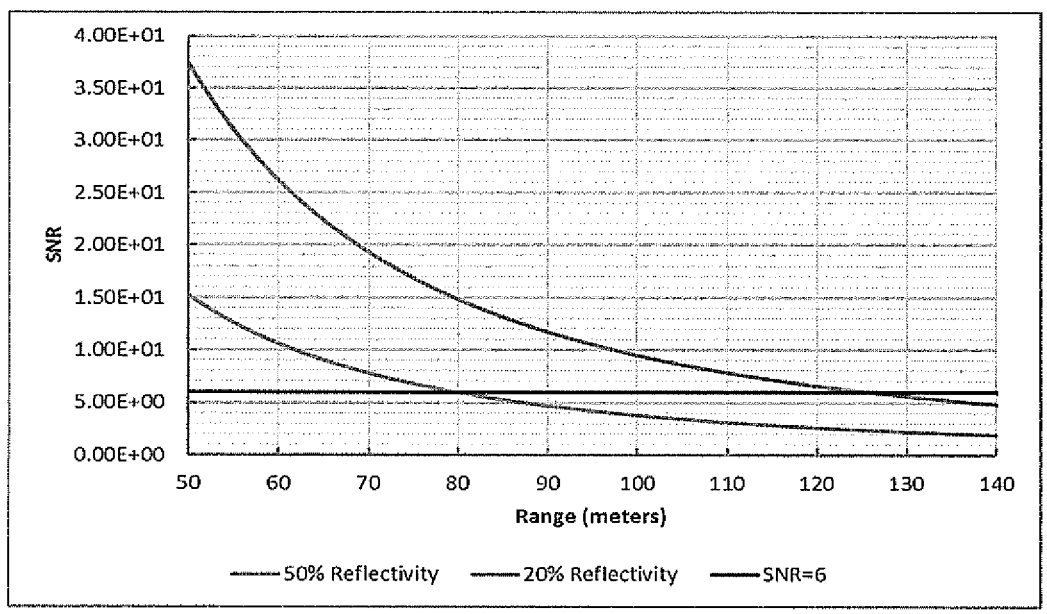
Figure 3. Exemplar ANGEL Predicted Performance

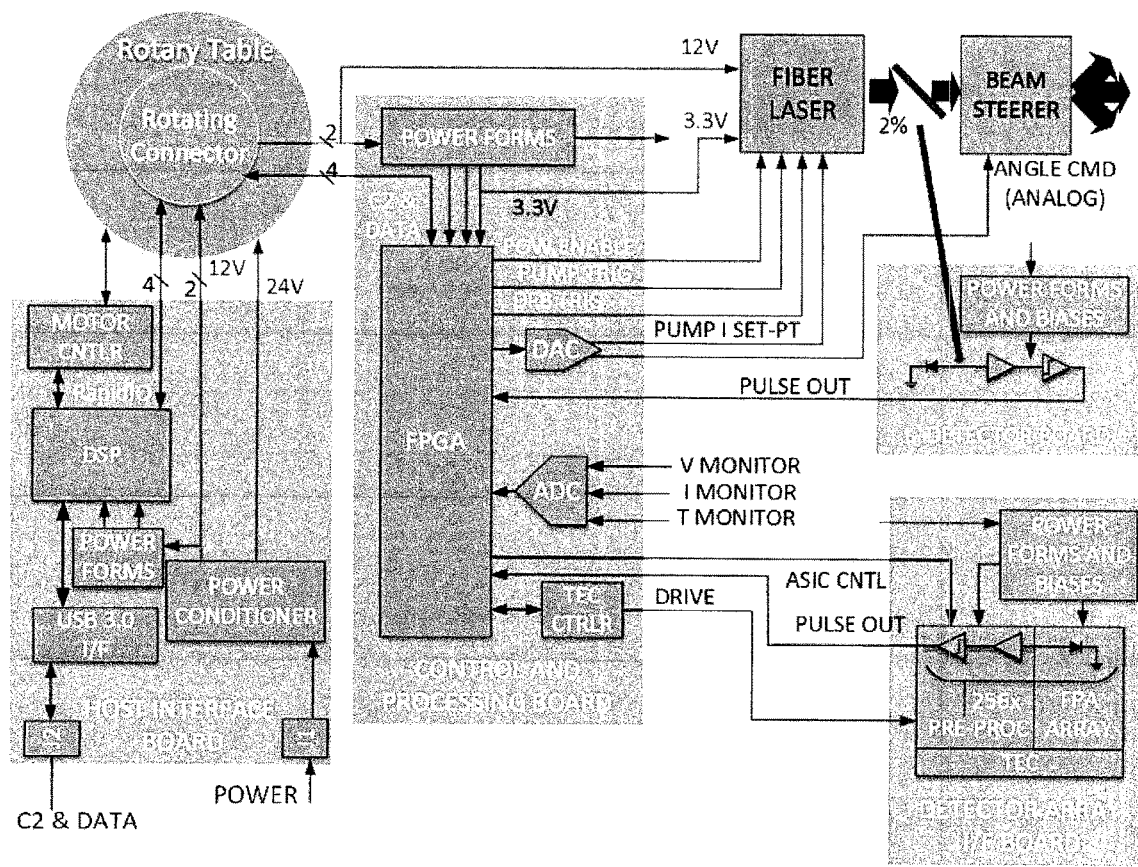
Figure 4. ANGEL Electronic Design

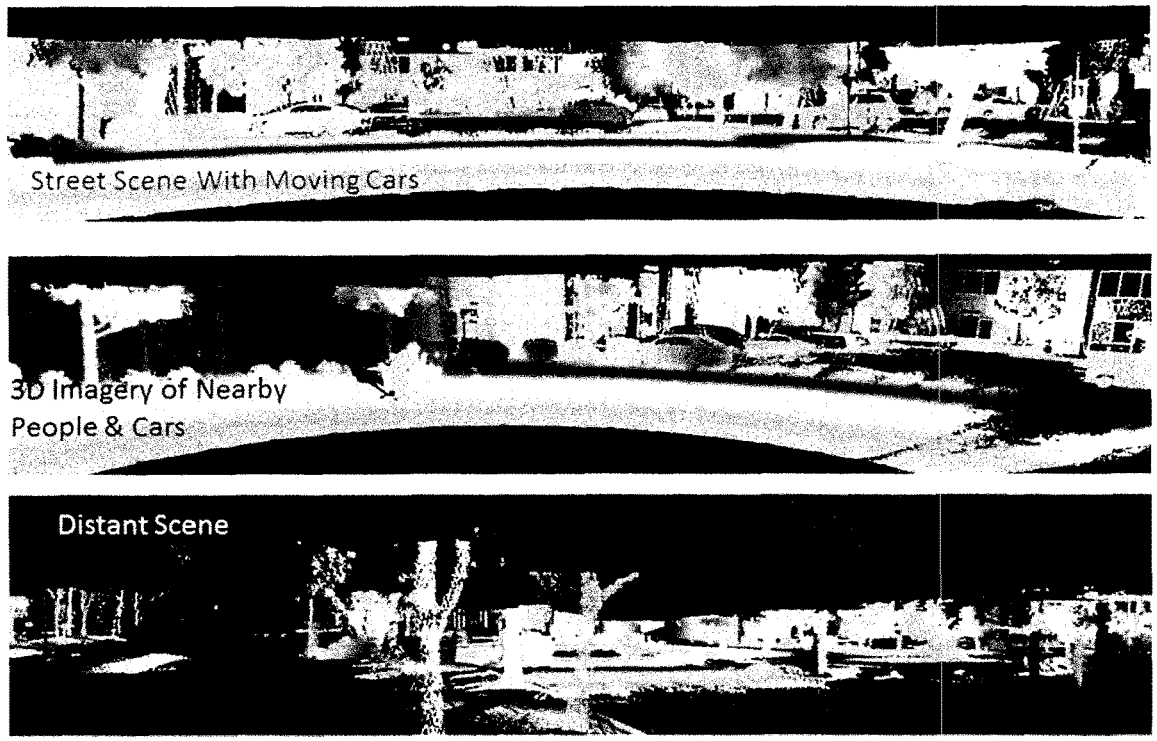
Figure 5. Data taken in the SWIR waveband by an Early Developmental Model.

AGILE NAVIGATION AND GUIDANCE ENABLED BY LIDAR (ANGEL)

CROSS-REFERENCE TO RELATED APPLICATIONS

This application claims the benefit of U.S. Provisional Patent Application No. 62/318,909, filed on 6 Apr. 2016 entitled "Agile Navigation and Guidance Enabled by LIDAR (ANGEL)" pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of three-dimensional (3D) imaging LIDAR sensor systems. More specifically, the invention relates to a low Size, Weight, and Power, (SWaP), fully eye-safe LIDAR sensor system that rapidly searches large fields of regard, produces high resolution three-dimensional images, determines image content and provides the information required of sensors to enable autonomous platforms, such as unmanned air vehicles and driverless cars to successfully navigate through complex regions under all conditions of lighting and under conditions of degraded visual environments.

2. Description of the Related Art

LIDAR systems produce image data in three dimensions due to their capability to measure the range to objects in scenes as well as the two-dimensional spatial extent of objects in scenes. This is generally accomplished by scanning a narrow laser beam over the elements of the scene to be observed; typically a very slow process. Larger scenes can be measured by such 3D LIDAR systems if multiple lasers are used in parallel. Mechanical assemblies, typically cumbersome and typically requiring high power to operate, are used to point or scan the laser beams over even larger areas. Such prior art systems can produce high resolution 3D images but typically require significant processing and rendering times. These features of the current state-of-the-art in 3D imaging LIDAR systems, when performing wide area imaging applications, undesirably result in complex systems.

Lasers used in these applications typically operate at visible and near-visible wavelengths. Such systems are rendered "eye-safe" by rapidly scanning the beams in such a fashion that eye damage levels are not reached in the areas of operation. The eye-safe feature has a risk of failure if the scanning mechanisms stop and the laser energy is continuously imaged or scanned at the same small angles for long periods of time. A further undesirable feature of prior art LIDAR systems is that the performance of such LIDAR systems operating in the visible and near infrared is significantly degraded when operating in conditions of visibility that are degraded by rain, fog, dust, or snow.

What is needed is a 3D LIDAR system which operates in an eye-safe mode under all operating conditions, requires only one laser to achieve wide area 3D imaging, provides for relatively high frequency scans of the scenes through which agile navigation is required, has undiminished performance when atmospheric visibility is degraded by environmental factors, and is mechanically simple compared to current systems. In addition, to be useful on small autonomous platforms, the LIDAR system must be very compact, have low weight and low power requirements. Such a device is the subject of this invention.

BRIEF SUMMARY OF THE INVENTION

The Agile Navigation and Guidance Enabled by LIDAR (ANGEL) is a compact, low weight sensor system operating in the eye-safe spectral region at 1.5 microns. The laser of the preferred embodiment is a high pulse rate fiber laser that is steered over an elevation field using a nonlinear optical device. The full elevation field of view is occupied by a linear row of detectors sensitive to the 1.5 micron light returned from the laser pulses reflected off of distant objects in the scanned scene. A large 360 degree azimuth field of regard is searched by causing the sensor to frequently rotate in a 360 degree pattern. A data processing element or data processor is configured to calculate the time of flight of the returned laser pulse and translates the time of flight into a precise estimation of range. The LIDAR system of the invention operates well under conditions of degraded visual environment and in day and night times of operation. The long detection ranges achieved and the high spatial and range resolutions measured by the above sensor enable early detection of objects that may impact the LIDAR carrying vehicle and allow the system to generate data to execute timely avoidance of potential collisions. The ANGEL LIDAR system can be deployed on unmanned aerial vehicles and on surface vehicles that need to detect potential collisions and thus need detailed situation awareness of their surroundings.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE SEVERAL VIEWS OF THE DRAWINGS

FIG. 1 shows an exemplar design of the ANGEL sensor of the invention for land vehicle navigation.

FIG. 2 shows the specific design parameters of a preferred embodiment of the ANGEL exemplar.

FIG. 3 shows the predicted performance of the preferred embodiment of the ANGEL exemplar.

FIG. 4 shows the design elements of the system electronics of a preferred embodiment of the invention including those which determine the flight time of detected return pulses and those which calculate the associated range to the scene element which is observed.

FIG. 5 shows scene data samples in the important, fully eye safe SWIR spectral wavelength with the resolution and frame rate required to enable agile navigation and guidance of autonomous land and air vehicles.

The invention and its various embodiments can now be better understood by turning to the following description of the preferred embodiments which are presented as illustrated examples of the invention in any subsequent claims in any application claiming priority to this application. It is expressly understood that the invention as defined by such claims may be broader than the illustrated embodiments described below.

DETAILED DESCRIPTION OF THE INVENTION

The disclosed ANGEL LIDAR system operates in a fundamentally new manner over prior art LIDAR systems by combining features of flash LIDAR and scanning LIDAR systems simultaneously which enables mission and performance trades to be conducted by varying the sizes of the laser illumination patches within the scenes being scanned and observed. Further, the combination of these modes of operation into a single LIDAR system enables multiple modes of operation and multiple missions to be accomplished with one laser, obviating the need for multiple lasers and enabling significant simplification of beam control modes. Systems which result from the new size, weight, power, cost trade space enabled by the ANGEL concept provide new levels of performance over prior art systems, thereby enabling diverse missions to be accomplished by the device at significantly reduced risks and costs and with significantly enhanced performance.

The ANGEL LIDAR system disclosed herein operates using a single eye-safe laser with very high pulse rates but very low energy per pulse. The eye-safe feature of these lasers is inherent in its operating wavelength which is preferably 1.54 microns in the SWIR spectral region. No human eye damage can occur in this region even if the 3D LIDAR scanning mechanisms are not operating properly. The small laser is mounted in the upper design element of ANGEL LIDAR which is illustrated in FIG. 1. This portion of the embodiment rotates at user-defined speeds that are determined by the application needs. For example, detection ranges and update rates needed by autonomous car navigation missions can be achieved by setting the rotation rate to about 5 Hz. A holographic optical element (HOE) is integrated with illumination path of the laser's output and shapes the exiting laser beam into a "top hat" form, providing uniform illumination over multiple pixels in the system detection array. The holographic optical element shapes the outgoing beam into mission appropriate size, typically a 30 degree elevation beam with uniform illumination. The outgoing beam may be configured to cover 256 elevation spatial samples and one azimuth spatial sample. Bean scanning in elevation scanning is not required in this design approach for this exemplar application. Azimuth scanning is accomplished by mechanical azimuth rotation of the upper chamber. The laser returns from scene elements are received by a system focal plane array which is matched to the outgoing beam field of regard and may consist of 256 InGaAs pin diodes configured in a linear array. Fast time samples of each of these detectors enable objects to be detected and their ranges determined within each of the 256 pixels of the array. Range measurements better than 10 cm can thus be obtained throughout a 360 degree azimuth by a 30 degree elevation field of regard. The high resolution instantaneous field of view of each pixel is 2.0 milliradians which produces a high resolution spatial picture of the scene as the high resolution range data is being obtained. A receiver telescope is positioned in the center of the upper chamber to capture the returning photons reflected from the scene elements. These measurements are then transmitted to the signal processor of the system which performs the image exploitation processing and display processing for the system user. FIG. 4 shows an exemplar set of electronic processing steps used to determine range from each of the laser returns detected by each of the focal plane array pixels.

This innovative sensor, when combined with a navigation infrastructure on mobile, autonomous platforms enables:

Autonomous takeoff and landing capabilities for Unmanned Air Vehicles;

Timely fixed object avoidance when UAVs are in flight or landing or land vehicles are performing land navigation;

A search and detect capability in the near air space around the Unmanned Air Vehicles to detect and avoid other platforms in flight and around land or sea vehicles to detect and avoid other platforms operating near them;

Safe separations, in all directions, from other vehicles moving in the air space or on the land or sea area being navigated;

Accurate execution of desired flight paths and desired land or sea navigation paths;

Day/night operations from a single LIDAR sensor;

Operations in degraded visual environments.

The specific design parameters, including the large linear array of 256 detectors which enable the key performance of the LIDAR exemplar illustrated in FIG. 1, are provided in FIG. 2.

The performance enabled by the combinations of these parameters is shown in FIG. 3. The signal processing elements that determine the time of flight of a detected pulse and the associated range to target distance are shown in FIG. 4. A development model of this class of sensor has been built and used to take data which verifies the qualities of the resulting data for the anticipated applications. Samples of this data are provided in FIG. 5.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by any claims in any subsequent application claiming priority to this application.

For example, notwithstanding the fact that the elements of such a claim may be set forth in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A LIDAR sensor system for providing wide area search capability with three dimensional spatial resolutions, temporal resolution and frame times sufficient to enable a detect and avoid capability when deployed on unmanned vehicles that operate in day and night conditions and in conditions of degraded visibility, the LIDAR sensor system comprising:
    a single laser element having an output beam;
    the beam configured to be scanned 360-degrees over an elevation field at a user-defined speed using a holographic optical element configured to shape the beam to cover a single azimuth sample and plurality elevation spatial samples; and;
    a receiver telescope configured to capture returning beam photons reflected from a scene element and configured to optically couple the returning photons to a linear array of detector pixels having a height of the elevation fields.

2. The LIDAR sensor system of claim 1 further comprising a processor configured to calculate a time of flight of the returning photons and translate the time of flight into an estimation of a range of the scene element.

3. The LIDAR sensor system of claim 1 whereby the user-defined speed may be varied to define a varying-sized illumination patch within a scene proportional to the speed.

4. The LIDAR sensor system of claim 1 whereby the laser diode operates in the 1.5 micron spectral band.

5. The LIDAR sensor system of claim 1 whereby the processor comprises a field programmable gate array (FPGA) or a central processing unit (CPU).

6. The LIDAR sensor system of claim 1 further comprising a read out integrated circuit (ROIC) for each of the detector pixels in the linear array of detector pixels.

* * * * *